United States Patent [19]

Rozmus

[11] 4,428,906
[45] Jan. 31, 1984

[54] PRESSURE TRANSMITTING MEDIUM AND METHOD FOR UTILIZING SAME TO DENSIFY MATERIAL

[75] Inventor: Walter J. Rozmus, Traverse City, Mich.

[73] Assignee: Kelsey-Hayes Company, Romulus, Mich.

[21] Appl. No.: 372,563

[22] Filed: Apr. 28, 1982

[51] Int. Cl.³ ............................................... B22F 3/14
[52] U.S. Cl. ........................................ 419/48; 419/49; 419/56; 425/78; 425/405 R; 425/405 H
[58] Field of Search ............................ 419/48, 49, 56; 425/405 R, 405 H, 78

[56] References Cited

U.S. PATENT DOCUMENTS

| | | | |
|---|---|---|---|
| 3,356,496 | 12/1967 | Hailey | 75/226 |
| 3,455,682 | 7/1969 | Barbaras | 419/49 |
| 3,469,976 | 9/1969 | Iler | 75/204 |
| 3,622,313 | 11/1971 | Havel | 419/49 |
| 3,689,259 | 9/1972 | Hailey | 75/226 |
| 4,041,123 | 8/1977 | Langet et al. | 419/49 |
| 4,081,505 | 3/1978 | Kawai | 425/405 H |
| 4,368,074 | 1/1983 | Otto, Jr. et al. | 419/51 |

Primary Examiner—Brooks H. Hunt
Attorney, Agent, or Firm—Harold W. Milton, Jr.

[57] ABSTRACT

A quantity of material (10), which is at less than a predetermined density, is disposed within a sealed container (12) which is, in turn, encapsulated in a pressure-transmitting (18) medium which is, in turn, placed within a pot die (20) of a press where it is restrained as a ram (24) enters the pot die (20) and applies a force to the pressure-transmitting medium (18) to densify the material within the container into a compact (10') of predetermined density. The pressure-transmitting medium (18) is characterized by a rigid interconnected ceramic skeleton structure (26) which is collapsible in response to a predetermined force and fluidizing glass (28) capable of fluidity and supported by and retained within the skeleton structure (26). The glass (28) becomes fluidic and capable of plastic flow at temperatures utilized for compaction whereas the ceramic skeleton (26) retains its configuration and acts as a carrier for the fluidic glass (28). As external pressure is applied by coaction between the pot die (20) and ram (24), the ceramic skeleton structure (26) collapses to produce a composite (18') of ceramic skeleton structure fragments (26') dispersed in the fluidizing glass (28) with the composite (18) being substantially fully dense and incompressible and rendered fluidic and capable of plastic flow at the predetermined densification of the material being compacted within the container. Accordingly, the ceramic skeleton structure (26) is dominant to provide structural rigidity and encapsulation and retainment of the fluidic glass (28') until the skeleton structure (26) is collapsed under ram (28') becomes dominant to provide omni-directional pressure transmission to effect the predetermined densification of the material being compacted within the container (12).

24 Claims, 3 Drawing Figures

PRESSURE TRANSMITTING MEDIUM AND METHOD FOR UTILIZING SAME TO DENSIFY MATERIAL

TECHNICAL FIELD

The subject invention is used for consolidating material of metallic and nonmetallic powder compositions and combinations thereof to form a predetermined densified compact. Consolidation is usually accomplished by evacuating a container and filling the container with a powder to be consolidated and thereafter hermetically sealing the container. Pressure is then applied to the filled and sealed container to subject the powder to pressure. Typically, heat is also applied to heat the powder to a compaction temperature. The combination of heat and pressure causes consolidation of the powder.

BACKGROUND ART

It is well known to place a hermetically sealed container with the powder therein in an autoclave or hot isostatic press where it is subjected to heat and gas pressure.

Because of the expense and limitations of an autoclave or hot isostatic press, there have been significant developments made wherein the powder to be compacted is encapsulated in a substantially fully dense and incompressible container providing a pressure-transmitting medium which maintains its configurational integrity while being handled both at ambient temperatures and at the elevated compaction temperatures, yet becomes fluidic and capable of plastic flow when pressure is applied to the entire exterior surface thereof to hydrostatically compact the powder. Typically, the powder is hermetically encapsulated within the pressure-transmitting medium which is thereafter heated to a temperature sufficient for compaction and densification of the powder. After being sufficiently heated, the pressure-transmitting medium with the powder therein may be placed between two dies of a press which are rapidly closed to apply pressure to the entire exterior of the pressure-transmitting medium. The pressure-transmitting medium, at least immediately prior to a selected predetermined densification, must be fully dense and incompressible and capable of plastic flow so that the pressure transmitted to the powder is hydrostatic and, therefore, from all directions, i.e., omnidirectional.

SUMMARY OF THE INVENTION AND ADVANTAGES

The subject invention is for consolidating material of metallic and nonmetallic compositions and combinations thereof to form a densified compact of a predetermined density wherein a quantity of such material which is less dense than the predetermined density, is encapsulated in a pressure-transmitting medium to which external pressure is applied to the entire exterior of the medium to cause the predetermined densification of the encapsulated material by hydrostatic pressure applied by the medium in response to the medium being substantially fully dense and incompressible and capable of fluidic flow, at least just prior to the predetermined densification. The invention is characterized by utilizing a pressure-transmitting medium of a rigid interconnected skeleton structure which is collapsible in response to a predetermined force and fluidizing means capable of fluidity and supported by and retained within the skeleton structure for forming a composite of skeleton structure fragments dispersed in the fluidizing means in response to the collapse of the skeleton structure at the predetermined force and for rendering the composite substantially fully dense and incompressible and fluidic at the predetermined densification of the compact.

In order to effect compaction hydrostatically through a substantially fully dense and incompressible medium in a press, the press must provide sufficient force to cause plastic flow of the medium. The force necessary is a function of the fluidity or viscosity of the medium which is, in turn, typically a function of the temperature of the medium. It is desirable to heat the medium to a temperature sufficient that the medium becomes very fluidic or viscous; however, the medium must retain its configuration during and after being heated so that it may be handled for placement in the press without change in its configuration. An advantage to the subject invention is that the fluidizing material supported by the skeleton structure may be heated to a temperature whereby it becomes very fluidic and requires minimal force to effect plastic flow, yet the skeleton structure retains the overall configuration so that the medium may be heated and then placed into the press for compaction. The skeleton structure collapses or crushes with minimal force and is dispersed into the fluidized material which then offers relatively little resistance to plastic flow to thereby hydrostatically compact the powder. Consequently, in any given set of circumstances, a predetermined densification may be attained in a press of minimal tonnage rating. In other words, in accordance with the subject invention a very high percentage of the available force provided by the press is transmitted hydrostatically directly to the powder being compacted. This is because the skeleton structure supports by encapsulating and/or retaining a fluidizing material which may be very fluid with the skeleton structure remaining rigid until it is collapsed and crushed with a minimal force. The press then requires minimal force to effect plastic flow of the highly fluidized material and most of the press force is transmitted hydrostatically directly to the powder. Said another way, to effect full densification of a powder in a fluidic medium, a press of higher capacity will be required when the medium is less fluid and therefore requires greater force for plastic flow than when the medium is very fluid and requires little force for plastic flow.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE INVENTION

Figure 1:
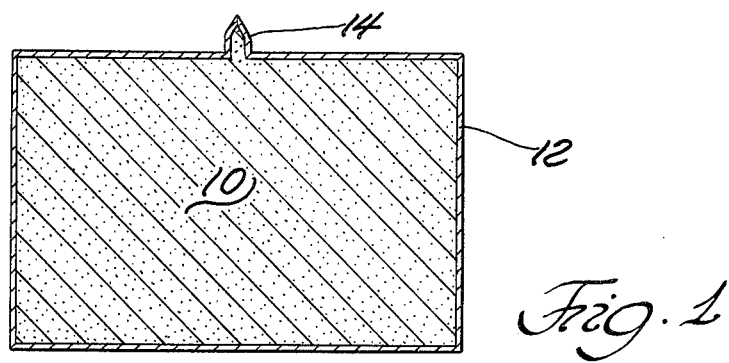
FIG. 1 is a cross-sectional view of a container containing less than fully dense powdered material.

The subject invention may be utilized for consolidating various metallic powders and nonmetallic powders, as well as combinations thereof, to form a densified compact. In accordance with the invention, the degree of density of the powder is increased to a predetermined or desired density which may be full density or densification or less than full density or densification.

The invention relates to a method for consolidating material of metallic and nonmetallic compositions and combinations thereof to form a densified compact of a predetermined density wherein a quantity of such material which is less dense than the predetermined final density is encapsulated in a pressure-transmitting medium to which external pressure is applied to the entire exterior of the medium to cause a predetermined densification of the encapsulated material by hydrostatic pressure applied by the medium in response to the medium being substantially fully dense and incompressible and fluidic, at least just prior to the predetermined densification.

As the invention is illustrated, a quantity of less than fully dense powder 10 fills a container 12. The container 12 is evacuated as by a vacuum through a tube 14 and then is filled with the powder 10 under vacuum through the tube 14. After filling, the tube 14 is sealed to hermetically seal the container 12 with the powder 10 under vacuum therein. The container 12 may be filled and sealed in accordance with the teachings of applicant's U.S. Pat. No. 4,229,872 granted Oct. 28, 1980 and assigned to the assignee of the subject invention.

The container 12 is circular in cross section to define a cylinder and has a fill tube 14 extending upwardly from the top thereof. It will be understood, however, that the configuration of the container will depend upon the desired configuration of the end part or compact.

The container 12 with the less dense powder 10 therein is then placed in a casting mold 16 wherein a pressure-transmitting medium, generally indicated at 18, is cast about the container 12 to encapsulate the entire container 12 and the less dense powder material 10. The pressure-transmitting medium 18 solidifies so to retain its configuration and is removed from the casting mold 16.

Sometime later, the pressure-transmitting medium 18, which encapsulates the container 12 and less dense powder 10, is placed in a press having a cup-shaped pot die 20, which has interior walls 22 extending upwardly from the upper extremity of the pressure-transmitting medium 18. A ram 24 of the press is moved downwardly in close sliding engagement with the interior walls 22 to engage the pressure medium. The ram 24 therefore applies a force to a portion of the exterior of the pressure-transmitting medium while the pot die 20 restrains the remainder of the pressure-transmitting medium so that external pressure is applied to the entire exterior of the pressure-transmitting medium and the pressure-transmitting medium acts like a fluid to apply hydrostatic pressure to densify the powder 10 into a predetermined densified compact 10'.

The subject invention is characterized by the pressure-transmitting medium 18 including a rigid interconnected skeleton structure 26 which is collapsible in response to a predetermined force. The skeleton structure 26 may be of a ceramic-like material which is rigid and retains its configuration, but which may be broken-up, crushed or fractionated at a predetermined relatively minimal force. The skeleton structure 26 is defined by the ceramic material being interconnected to form a framework, latticework or matrix. The pressure-transmitting medium 18 is further characterized by including a fluidizing means or material 28 capable of fluidity and supported by and retained within the skeleton structure 26. The fluidizing material may, among other materials, be glass or an elastomeric material. In other words, glass granules or particles are disposed in the openings or interstices of the skeleton 26 so as to be retained and supported by the skeleton structure 26. It is to be understood, that for the purposes of illustration, the size of the skeleton structure 26 and the fluidizing material 28 in the drawings is greatly exaggerated. By analogy, the medium 28 may be compared to cast concrete cement with gravel dispersed therein, the cement being the structure and the gravel being the glass particles.

Figure 2:
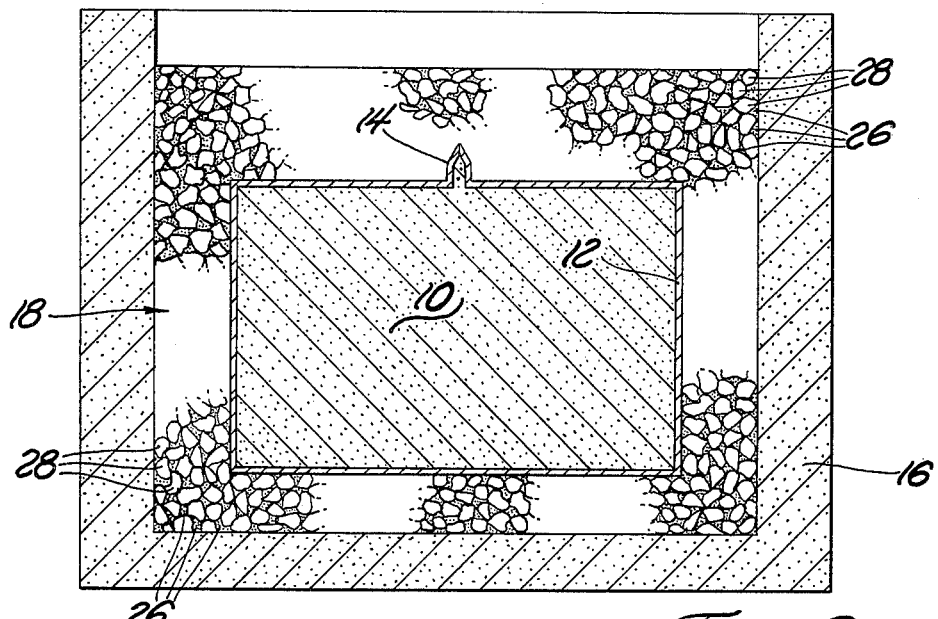
FIG. 2 shows the container of FIG. 1 disposed in a casting mold with the pressure-transmitting medium of the subject invention cast thereabout.
Figure 3:
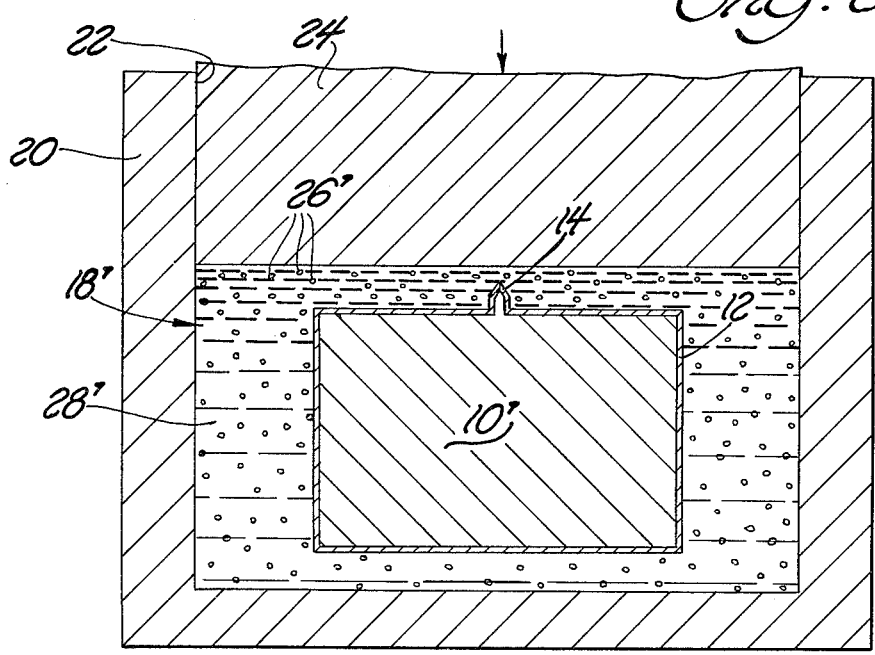
FIG. 3 is a cross-sectional view of the pressure-transmitting medium encapsulating the compact after full densification between a pot die and a ram.

An example of how the pressure-transmitting medium 18 may be formed is to mix a slurry of structural material in a wetting fluid or activator with particles or granules of the fluidizing material dispersed therein. Specifically, and by way of example, the structural material may be a ceramic sold by Ranson and Randolf of Toledo, Ohio under the trademark "50/50 CORE MIX." The glass may be glass culet or granular glass having a 1/16" major axis or designated 20–40 size and sold by the Bassishis Company of Cleveland, Ohio. The glass and ceramic is mixed with three parts glass to one part ceramic with water being added to wet or activate the ceramic. The slurry may be mixed from 4½ to 6 minutes. A portion of the slurry is then poured into the bottom of the casting mold 16 to form a bottom layer upon which the container 12 is positioned and thereafter additional slurry is poured into the casting mold 16 to completely encapsulate the container 12 and the less than fully dense powder 10 therein as shown in FIG. 2. The pressure-transmitting medium 18 will then set up in approximately 6½ to 10 minutes, at which point the skeleton structure 26 is rigid so that it will retain its integrity and configuration. The pressure-transmitting medium 18 may then be removed from the casting mold 16 after which it is preferably further dried by curing in a hot box or oven. The pressure-transmitting medium 18 comprises a greater content by volume of fluidizing glass than the structural ceramic defining the skeleton structure 28. Actually, no more structural material need be utilized than is necessary to provide a skeleton structure or carrier sufficient to support and retain the fluidizing material. The maximum density of the skeleton material 26 in the medium 18 is that which will allow the ram 24, within its stroke, to completely crush the skeleton 26 into particles 26' without the particles 26' preventing movement of the ram before the ram moves sufficiently to render the composite 18' of the glass 28' and particles 26' completely fully dense and incompressible immediately before the predetermined or desired densification of the compact, which predetermined density is reached or occurs at the end of the stroke of the ram 24. Said another way, the ram stroke does not end until after the composite 18' of the molten glass 28' with the particles 26' dispersed therein becomes fully dense and incompressible and the powder 10 reaches the predetermined or preselected density.

Typically, and as with the example disclosed herein, the encapsulated less than fully dense material 10 is heated to a compaction temperature above ambient prior to the predetermined densification. In other words, before being placed in the pot die 20, the pressure-transmitting medium 18 and the encapsulated container 12 and powder 10 are heated by being placed in a furnace to a temperature sufficient for compaction of the powder 10 at a given ram pressure or force. In such heating, the glass or other fluidizing material supported by the skeleton structure 18 softens and becomes fluidic and capable of plastic flow and incapable of retaining its configuration without the skeleton structure 28 at the compaction temperature to which the powder 10 has been heated for the predetermined densification. However, the skeleton structure 26 retains its configuration and rigidity at the compaction temperature. Thus, the heated pressure-transmitting medium 18 may be handled without losing its configuration after being heated to compaction temperature so that it may be placed within the pot die 20.

Upon being placed in the pot die 20, the ram 24 engages the upper surface of the pressure-transmitting medium while the remainder of the exterior of the pressure-transmitting medium is restrained from movement by the pot die 20. Initial downward movement of the ram 24 therefore applies an external force or pressure and collapses or crushes the skeleton structure 26 with a minimal predetermined force to produce a composite 18' of structure fragments 26' dispersed in a homogeneous fluid mass of the fluidizing glass 28'. In other words, initial application of pressure or force by the ram 24 collapses the skeleton structure 26 into multiple fragments which are then dispersed in the fluid and viscous glass 28'. Normally, the pressure-transmitting medium 18 is not fully dense in that there may be voids in the skeleton structure not completely filled by the fluidizing glass or other material. Thus, after the skeleton structure has collapsed and before reaching the predetermined densification of the compact 10', the composite 18' of the fluid glass 28' and structure particles 26' dispersed therein is substantially fully dense and incompressible and is rendered fluidic and capable of plastic flow through the fluidity of the fluidized glass material 28'. Thus, the fluidizing material or glass 28 is supported by and retained within the skeleton structure 26 for forming a composite 18' of skeleton structure fragments 26' dispersed in the fluidizing material 28' in response to the collapse of the skeleton structure 26 at a predetermined force applied by the ram 24, thereby rendering the composite 18' substantially fully dense and incompressible and fluidic at the predetermined densification of the compact at which point hydrostatic pressure is applied by the composite 18' omni-directionally to the entire exterior surface of the container 12 to compact the powdered metal 10 into the predetermined densified compact 10'.

Preferably, the glass fluidizing material is rigid and frangible at ambient temperatures, but becomes fluidic and capable of plastic flow and incapable of retaining its configuration without the skeleton structure 26 at the compaction temperatures above ambient used or necessary for compaction and predetermined densification of the compact 10'. However, the skeleton structure 26 is rigid and retains its configuration at the compaction temperatures, but collapses and fragments when subjected to a minimal predetermined collapsing force. Thus, a minimal force is required of the ram 24 for collapsing the skeleton 26 into the fragments 26' whereby the composite 18' of the fluid glass 28' and skeleton particles 26' dispersed therein becomes fully dense and incompressible and acts like a fluid to apply hydrostatic pressure for the predetermined densification of the compact 10', i.e., the force of the ram 24 is transmitted hydrostatically and omni-directionally directly to the container 12 through the composite 18' for reducing the volume or size of the container 12 to densify the compact 10' to the predetermined and selected density.

After full compaction, the composite 18' cools so that the glass 28' again becomes rigid and frangible. Actually, the pot die 20 is normally made of metal of high thermal conductivity so that the exterior surfaces of the glass 28' of the composite cool and rigidify first and as the ram 24 is retracted to expose the upper surface to ambient temperature, it cools and solidifies. Both the fluidizing glass and the skeleton structure have very low heat conductivity; thus, the composite 18' with the compact 10' therein may be removed from the pot die 20 with the exterior surfaces cooled and rigidified, but with the interior of the composite 18' not yet cooled and rigidified so that the composite acts somewhat like a marshmallow wherein the exterior surfaces are sufficiently cooled and rigid for handling while the interior remains fluid and hot.

After the composite 18' is removed from the pot die 20, it is allowed to cool to the point where the glass 28' immediately next to the container 12 or compact 10' is solid so that it does not stick to the container 12. The composite 18' is then a rigid and frangible brick and may be removed from the container 12 by shattering the composite 18' into fragments, as by striking with a hammer, or the like. In other words, after being completely cooled so as to become rigid and frangible, the solid glass 28' may be struck and will fractionate and break up as glass normally does. Thereafter, the container 12, which is typically made of a thin metal, may be removed by machining or chemically.

Generally, metals become gradually more fluidic or capable of plastic flow as the temperature is increased. Of course, at very low temperatures a greater force would be necessary to cause plastic flow in a metal whereas protionally less force would be required as the temperature is increased. However, glass remains rigid and frangible while being heated until it reaches a predetermined temperature at which it becomes very capable of plastic flow. Said another way, the glass loses its fluidity or plastic flow characteristics and becomes rigid in a relatively narrow temperature range.

This characteristic of a material which remains rigid and incapable of plastic flow until it is heated to a predetermined temperature in a very narrow range, is a distinct advantage. When the heated medium is in the pot die 20, the fluidized glass 28' of the composite immediately adjacent and engaging the pot die walls 22 will be cooled by heat conduction to the metal pot die 20 and, consequently, solidify in a thin layer which reduces the further heat transfer from the interior of the composite 18' to the pot die 20 because of the very low heat conductivity of the glass. As the ram 24 continues to move downwardly further, this thin solidified layer, which is a column, will be crushed and dispersed into the interior molten glass 28'. Additionally, there are always tolerances which exist in a press for many reasons, such as wear. Consequently, there is always a clearance between the ram 24 and the interior walls 22 of the pot die 20. As will be appreciated, if the composite acted upon by the ram 24 were a liquid such as water, the water would merely flow out the gap between the ram 24 and the interior walls 22 of the pot die 20 without applying hydrostatic pressure to the container 12. However, by utilizing glass or other fluidizing material which has a very narrow temperature range at which it loses its fluidity or plastic flow characteristics and becomes rigid, a seal is provided. Specifically, any molten glass 28' which moves into the gap between the ram 24 and the interior wall 22 of the pot die 20 is cooled by the pot die 20 and the ram 24 because of the high heat conductivity of the metal thereof and solidifies at the interface between the interior walls 22 and the ram 24 to provide a seal for preventing the flow of the fluid composite 18' between the ram 24 and the interior walls 22. Therefore, all of the force of the ram 24 is utilized to create hydrostatic pressure within the contained composite 18' defined by the fluid glass 28' and the ceramic fragments 26'.

The skeleton structure 26 defines a matrix of interconnected segments providing voids therein and has structural rigidity and strength so as to retain its configuration at both ambient and high temperatures, but which will collapse into fragments at a predetermined low force. It must be, of course, compatible for retaining and supporting the fluidizing material at ambient temperatures as well as the temperatures to which the fluidizing material will be raised for compaction and densification of the compact 10'. When it is stated that the skeleton structure 26 supports and retains the fluidizing material, this means that the fluidizing material does not move out of the skeleton structure until the skeleton structure 26 becomes nonexistent because of its collapse into particles 26'. The fluidizing material 28 has rigidity at low or ambient temperatures, but at high temperatures has a high degree of fluidity. Thus, the skeleton structure 26 permits a higher degree of fluidity of the fluidizing material 28 than is possible when using the fluidizing material 28 alone because when used alone, the fluidizing material 28 would lose its configuration and could not be handled and would not remain in position encapsulating the powder 10. Consequently, the medium 18 has rigidity at high temperature and fluidity at high temperature. It is rigid and retains its configuration so that it may be easily handled at ambient temperatures as well as after heating for compaction. Accordingly, the ceramic skeleton structure 26 is dominant to provide structural rigidity and encapsulation and retainment of the fluidic glass 28' until the skeleton structure 26 is collapsed under ram 24 force, at which time the fluidic glass 28' becomes dominant to provide omni-directional pressure transmission to effect the predetermined densification of the material being compacted within the container 12.

Although the preferred embodiment has been described as utilizing glass for the fluidizing material, other suitable materials may be used as, for example, numerous elastomers might be utilized. In addition, in certain instances it may be possible to encapsulate the less dense powder 10 within the pressure-transmitting medium 18 without an intermediate container 12. The container 12 has been disclosed as a very thin-walled container, however, a thick-walled container which does not closely follow the contour of the compact 10' and permits more intricately shaped powder containing cavities may be utilized by being encapsulated within the pressure-transmitting medium 18 to, in turn, transmit hydrostatic pressure applied by the pressure-transmitting medium 18 omni-directionally to the powdered metal to effect the predetermined desired densification. Also, the pressure-transmitting medium 18 may be cast in separate halves which are then placed in mating engagement to encapsulate the container 12.

As alluded to above, the less dense initial material 10 may be particulate powder or a somewhat dense material, such as powder, which has been densified only to a degree. For example, the initial material may be powder which has been compacted to a certain degree, such as to fifty or seventy percent density and to a desired shape, in which case the material 10 would not require a container, but would only be encapsulated in the composite 18. The initial material may be cold compacted or even cast in a mold to a desired shape. Thereafter, the desired shape of a density which is less than the predetermined end or desired density is further densified to the predetermined density in accordance with the subject invention. The final or desired or predetermined density obtained by utilizing this invention would be a density greater than the density of the initial material encapsulated in the composite 18, but is not necessarily one hundred percent or full density.

Additionally, the invention has been described as with reference to ambient temperatures, but it is to be understood that a fluidizing material may be used that is capable of being cooled to a frangible temperature after compaction (which may be below or above ambient temperature) after compaction and the predetermined densification so that it may be shattered into fragments.

In some instances with certain materials, it may be possible to control the time of cooling after compaction to control the microstructure of the compact. Because of the low heat conductivity of the composite 18' of the glass 28' and the structure particles 26', it could take a great length of time for the compact to cool in ambient conditions, whereas if the entire composite were quenched in a cooling medium, the compact would cool very rapidly.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A method for consolidating material (10) of metallic and nonmetallic compositions and combinations thereof to form a densified compact (10') of a predetermined density wherein a quantity of such material (10) which is less dense than the predetermined density is subjected to a pressure-transmitting medium (18) to which external pressure is applied to the medium to cause a predetermined densification of the less dense material by hydrostatic pressure applied by the medium in response to the medium being substantially fully dense and incompressible and capable of fluidic flow at least just prior to the predetermined densification, characterized by utilizing a pressure transmitting medium (18) of a rigid interconnected skeleton structure (26) which is collapsible in response to a predetermined force and a fluidizing material (28) capable of fluidity and supported by and retained within the skeleton structure (26), and applying pressure to collapse the skeleton structure (26) to produce a composite (18') of structure fragments (26') dispersed in the fluidizing material (28') with the composite (18') being substantially fully dense and incompressible and rendered fluidic through the fluidized material (28) at the predetermined densification of the compact (10').

2. A method as set forth in claim 1 further characterized as encapsulating the less dense material (10) in the pressure transmitting medium (18) by first disposing the less dense material (10) in a sealed container (12) and then encapsulating the sealed container (12) in the pressure transmitting medium (18).

3. A method as set forth in either claim 1 or 2 further characterized as applying external pressure to the entire exterior of the pressure transmitting medium (18') by applying force (24) to a portion of the exterior of the pressure transmitting medium which restraining (20) the remainder of the pressure transmitting medium (18').

4. A method as set forth in either claim 1 or 2 further characterized by utilizing a pressure transmitting medium (18) comprising a greater content of fluidizing material (28) than structure material (26).

5. A method as set forth in claim 1 further characterized by forming the pressure transmitting medium (18) by mixing a slurry of structural material in a wetting fluid with particles of the fluidizing material dispersed therein, casting the slurry and drying same for forming the pressure transmitting medium.

6. A method as set forth in claim 5 further characterized by mixing the slurry of a ceramic in water with particles of glass dispersed therein and drying the ceramic to define the skeleton structure (26) supporting the glass particles defining the fluidizing material (28).

7. A method as set forth in either claim 1 or 2 wherein the less dense material (10) is heated to a compaction temperature prior to the predetermined densification and further characterized by utilizing a skeleton structure (26) which retains its configuration and rigidity at the compaction temperature.

8. A method as set forth in either claim 1 or 2 wherein the less dense material (10) is heated to a compaction temperature prior to the predetermined densification and further characterized by utilizing a skeleton structure (26) which retains its configuration and rigidity at the compaction temperature and by utilizing a fluidizing material (28) which, at compaction temperature, is fluidic and capable of the plastic flow and incapable of retaining its configuration without the skeleton structure.

9. A method as set forth in either claim 1 or 2 further characterized by utilizing a fluidizing material (28) which is rigid at ambient temperatures.

10. A method as set forth in either claim 1 or 2 wherein the less dense material (10) is heated to a compaction temperature prior to the predetermined densification and further characterized by utilizing a fluidizing material which can be cooled to a frangible temperature after the predetermined densification, cooling the composite (18') to a frangible state after the full densification and shattering the composite (18') into fragments.

11. A method as set forth in either claim 1 or 2 further characterized by utilizing a skeleton structure (26) and fluidizing material (28) which have low thermal heat conductivity.

12. A method as set forth in either claim 1 or 2 further characterized by utilizing a ceramic skeleton structure (26) and a glass fluidizing material (28).

13. A method as set forth in claim 1 wherein said pressure transmitting medium has pressure applied thereto by being disposed in a pot die (20) having interior walls (22) extending from the pressure transmitting medium and moving a ram (24) into the pot die (20) in close sliding engagement with the interior walls (22) to engage the pressure transmitting medium and characterized by utilizing a fluidizing material (28) which remains rigid while being heated until it reaches a predetermined temperature at which it becomes fluidic and capable of plastic flow.

14. A method as set forth in claim 13 further characterized by cooling and solidifying the composite (18') immediately adjacent the pot die (20) to reduce heat transfer from the interior of the composite (18') to the pot die (20).

15. A method as set forth in claim 13 further characterized by cooling and solidifying the composite (18') at the interface between the interior walls (22) and the ram (24) to provide a seal for preventing the flow of the fluid composite (18') material between the ram (24) and the interior walls (22).

16. A pressure-transmitting medium (18) of the type for encapsulating a quantity of material (10) which is less dense than a predetermined density by applying pressure thereto to form a densified compact (10') of the predetermined density, said pressure-transmitting medium (18) characterized by a rigid interconnected skeleton structure (26) which is collapsible in response to a predetermined force, and fluidizing means (28) capable of fluidity and supported by and retained within said skeleton structure (26) for forming a composite (18') of skeleton structure fragments (26') dispersed in said fluidizing means (28') in response to the collapse of said skeleton structure (26) at said predetermined force and for rendering said composite (18') substantially fully dense and incompressible and capable of fluidic flow at the predetermined density of said compact (10').

17. A medium as set forth in claim 16 wherein the content of said fluidizing means (28) is greater than the content of said skeleton structure (26).

18. A medium as set forth in claim 16 wherein said skeleton structure (26) comprises ceramic and said fluidizing means (28) comprises glass.

19. A medium as set forth in claim 16 wherein said fluidizing means (28) is fluidic and capable of plastic flow and incapable of retaining its configuration without said skeleton structure (26) at compaction temperatures used for densification of the compact (10') and said skeleton structure (26) is rigid and retains its configuration at the compaction temperatures.

20. A medium as set forth in claim 19 wherein said fluidizing means (28) is rigid and frangible at a temperature lower than said compaction temperature so that the composite (18') may be cooled to a frangible state after densification and shattered into fragments.

21. A medium as set forth in claim 20 wherein said fluidizing means (28) and said skeleton structure (26) have low heat conductivity.

22. A medium as set forth in claim 21 wherein said skeleton structure (26) is ceramic and said fluidizing means (28) is glass.

23. A medium as set forth in claim 19 wherein said fluidizing means (28) remains rigid while being heated until it reaches a predetermined temperature at which it becomes fluidic and capable of plastic flow.

24. A medium as set forth in claim 19 further characterized by including a sealed container (12) filled with the less dense material (10) and encapsulated in said pressure transmitting medium (18).

* * * * *